Figure 1:
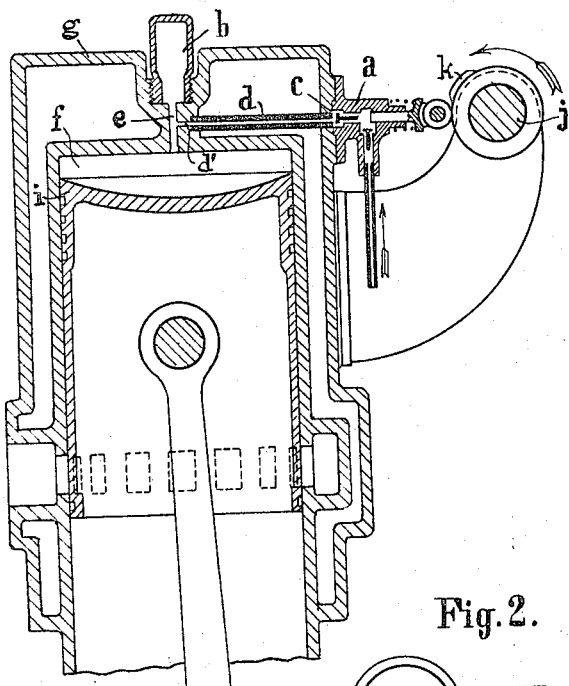

K. STEINBECKER.
MEANS FOR SUPPLYING FUEL TO INTERNAL COMBUSTION ENGINES.
APPLICATION FILED AUG. 5, 1913.

1,166,864.
Patented Jan. 4, 1916.

Witnesses:

Inventor: Karl Steinbecker

UNITED STATES PATENT OFFICE.

KARL STEINBECKER, OF CHARLOTTENBURG, GERMANY.

MEANS FOR SUPPLYING FUEL TO INTERNAL-COMBUSTION ENGINES.

1,166,864. Specification of Letters Patent. Patented Jan. 4, 1916.

Application filed August 5, 1913. Serial No. 783,012.

*To all whom it may concern:*

Be it known that I, KARL STEINBECKER, a citizen of the German Empire, and residing at Charlottenburg, near Berlin, Germany, have invented certain new and useful Improvements in Means for Supplying Fuel to Internal-Combustion Engines, of which the following is a specification.

My invention relates to the injection of fuel into internal combustion engines of the type in which ignition is independent of extraneous assistance.

Internal combustion engines are well-known in which the fuel is thrown into the working cylinder of the engine by means of a heated retort constantly connected with the cylinder by way of a duct. Some of the fuel injected into the neck of the retort is carried along by the air flowing to the retort, is ignited in the retort and injects the remainder of the fuel into the working cylinder where it is burnt. The employment in practice of such processes, whose object is to avoid the use of highly compressed injection air, necessitates however a knowledge of and regard for important physical and chemical laws. The present invention takes into account the importance and action of these hereinafter described laws and provides the means which reduce their action to the admissible amount in practice.

In the above described process of working such internal combustion engines which will serve as an example, the object of the retort is to have produced in it at a predetermined time an explosion whose energy shall drive the fuel at a predetermined time into the working cylinder. This object requires that the products of combustion be constantly removed with certainty from the retort and replaced by fresh air. Further, this exchange must take place without extraneous assistance, such as the aid of compressed air, but solely owing to the action of expansion out of and toward this clearance space or chamber which is connected with the cylinder solely by a narrow duct. The fuel supply pipe opens into this closed chamber or space at its narrowest part. This place, like the chamber itself, is under the influence of very severe fluctuations of pressure and temperature. These fluctuations are greatest just at the mouth of the fuel supply pipe because both the flowing highly-heated explosion gases and the fresh air forced into the chamber bring about an intense exchange of heat. These conditions have a determining influence on the complicated cycle of action which takes place exceedingly rapidly.

In engines of the type described the quantity of fuel requisite per working cycle is exceedingly small and a very small quantity too much or too little injected too early or too late may render the working cycle impossible. For a 20 H. P. two-stroke cycle engine driven at 450 revs. per min. the quantity of fuel requisite per working cycle is approx. 0.165 c. cms., that is to say a cube having sides about 5.5 mm. long. The cubic content of the retort is however about 6% of the cubic content of the compression space of the cylinder. Only about 4% of the quantity of air at disposal in the retort for the preliminary explosion can however be inserted, in consequence of the throttle action of the nozzle. The quantity of fuel which can be burnt in the retort is therefore 4% of 0.165 c. cms., *i. e.* 0.0066 c. cms. This is a cube having sides 1.87 mm. long, thus the size of a pin head. In any case, therefore, it is exceedingly difficult to bring such exceedingly small quantities of fuel in their proper order into the retort when the load and speed vary, and the solution of the problem is quite impossible when the following fundamental conditions are not taken into consideration:—

Firstly, the cubic expansion of the fuel under the influence of varying temperatures. The temperatures of combustion in the working cylinder are about 2000° C., and those in the uncooled retort are certainly still higher. These hot gases flow past the mouth of the retort and heat the fuel directly and by conduction. If an increase of temperature of only 60° C., *e. g.* from 20° to 80° C., is reckoned, approximately the same as that experienced by the cooling water, according to Frankenheim the expansion of the fuel amounts to 6.24%. I will now point out what influence this expansion of the fuel has on the working cycle. The fuel in the supply pipe is replaced each cycle by cold fuel and is coldest at the moment when the injection is finished. From this moment onward it begins to be heated under the action of the combustion in the retort and of the flowing gases. The heating lasts until the moment when the new injection begins. In consequence of the fuel being heated and expanding it continues to issue in drops out of the outlet during this entire period, i. e. during both the expansion and also the compression stroke. Assuming that a quantity of fuel equal to that requisite per working cycle is exposed to a rise of temperature of only 60° C., 6.24% of this quantity will drop into the neck of the retort. That is about twice the quantity the retort can deal with. A fraction thereof suffices to render the working cycle impossible. The retort is filled with oil gases and the admission of air is prevented, so that the explosive rise of pressure requisite for atomizing the fuel takes place either not at all or too early or too late. Ignition does not take place or its proper time is not observed and the fuel is consequently thrown not to the cylinder, but to the retort which in a very short time becomes full of smoke and soot. These conditions are accentuated by the circumstance that the fuel possesses but little capacity for absorbing heat, so that great rises of temperature are brought about by small quantities of heat.

Secondly, the heat of vaporization is relatively small and consequently the abovementioned conditions are influenced still more unfavorably. On the other hand, as the temperature of vaporization is dependent on the pressure, in proportion as the pressures in the retort fall the fuel will issue as vapor from the outlet. These unfavorable influences are obviated or reduced to an admissible extent by cooling the pressure pipe uniformly up to its mouth and, above all, by making the space in the fuel supply pipe as small as is otherwise admissible.

Thirdly, the compressibility of the fuel influences the working cycle unfavorably. The kind of this influence and the order of its magnitude are shown by the following calculation:—According to Amagat the volume of paraffin oils is compressed 0.37% when the pressure rises from 1 to 35 atmospheres. If the cubic content of the fuel supply pipe is ten times the quantity of fuel requisite per cycle, when the pressure rises to 35 atmospheres $10 \times 0.37 = 3.7\%$ of the quantity of oil to be injected is retained in the pipe. In the case of a constant pressure engine the fuel is injected against a constant working pressure of about 35 atmospheres. During this time this quantity of oil can thus not pass into the neck of the retort. On the contrary, it will enter later in proportion as the counter pressure falls. Further, at the moment when the injection of fuel begins, the preliminary explosion starts in the retort. Momentary rises of pressure up to 90 atmospheres occur in the retort. These pressures discharge themselves through the neck of the retort and force the issuing fuel back into the pipe, compressing it still more. Thus at the moment when the atomization of the fuel should start and the high atomizing pressures are at disposal these pressures cannot pass into the neck of the retort at all. The fuel pump must first drive the fuel forward a distance equal to the amount it is compressed before the injection can begin. Also, these conditions are not altered by inserting in the mouth of the pipe a non-return or check valve, for the fuel behind the valve must first be brought to the internal state of equilibrium corresponding to the counter pressures before it can flow past.

Lastly, the elasticity of the pipe acts in the same unfavorable sense as the compressibility of the fuel. According to the selection of the diameter, thickness of wall, length of pipe and of the material the part played by elasticity of course varies. It may amount to a multiple of the compressibilty. Now these undesirable influences are permanently and certainly obviated according to my invention by, on the one hand, reducing the influence of compressibility to a minimum by providing a fuel supply pipe having a chamber of the smallest admissible cubic content and, secondly, by reducing the influence of the elasticity of the pipe to the smallest admissible amount by making the pipe as short and inelastic as possible.

It is to be understood that I do not limit the employment of these constructive necessities to the above described method of working. There is a large number of known methods which are intended to substitute the Diesel process by avoiding secondarily-produced injection compressed air by means of a simpler process, as, for example, by the action of displacement of the working piston or by conducting a portion of the working air around into an adjacent chamber. Even if in the Diesel engine the control of the point of time and duration of the injection is of the greatest importance, although there is at disposal in the stored compressed air a constant energy, in all processes which develop the energy of atomization in the working cylinder itself, the most exact control of these times is a necessity for the possibility of carrying them into practice. For here the energy of atomization is generated like a blow—by an explosion or sudden rise of pressure—and disappears at once. If therefore this energy of atomization produced as by a blow is to be properly utilized and if it is to be generated at the right time, the fuel must arrive at its place exactly at the intended time. This end is attained perfectly by means of the hereinafter described means for all such processes.

To these ends, my invention consists in the construction, arrangement and combination of parts described hereinafter and pointed out in the claims.

One illustrative embodiment of my invention and a modification thereof are represented by way of example in the accompanying drawing, wherein:—

Figure 2:
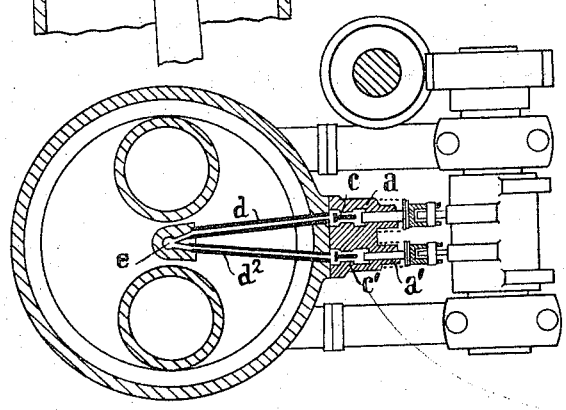

Figure 1 is a vertical section through the head of the cylinder of an internal combustion engine of the type described showing a preferred form of my invention, and Fig. 2 is a top plan view, party in horizontal section through the fuel supply pipes of an engine of the same type comprising two fuel pumps.

Referring to Fig. 1, the fuel pump *a* is located close to the retort *b* so that there is a very small clearance between the non-return valve *c* and the nozzle or mouth *d'* of the fuel supply pipe *d*. This strong rigid pipe which opens into the duct *e* connecting the retort with the working cylinder *f* has the smallest internal diameter admissible, which is particularly small at its mouth. It is carefully cooled up to its mouth or nozzle, this being effected in this embodiment by passing the pipe through the cooling jacket *g*. This arrangement has a special advantage because a constant temperature in the cooling chamber of the engine can be depended on. The pipe *d* may of course be provided, if desired, with a separate cooling jacket.

In order to keep the chamber or space between the valve *c* and the mouth *d'* of the pipe *d* as small as possible it may be necessary under certain circumstances to place the valve *c* farther away from the pump and closer to the mouth *d'*. In every case, however, the chamber or space behind the valve *c*, i. e. the clearance space in the pump, must be small. The valve *c* may be governed automatically or positively, and the pump itself may be driven indirectly.

My improved apparatus operates as follows:—During the compression stroke a portion of the air is forced by the working piston *i* through the narrow duct *e* into the retort. Owing to the arrangement of the described apparatus only pure air enters during this time into the retort. Only shortly before the end of the compression stroke is the fuel squirted in a thin fine jet by the pump *a* into the duct *e* constituting the narrow neck of the retort, and in consequence of the existing current of air flowing toward the retort the first particles of fuel are carried along into the retort where they at once burn completely in the highly heated pure air. The violent explosion which occurs now throws the remaining fuel finely atomized into the cylinder. The duration of the injection is determined by correctly selecting the following conditions:— beginning of the injection, size of the retort and amount of resistance in the duct *e* or in the neck of the retort. The cycle of operations when atomizing the fuel and injecting it into the working cylinder takes place in approximately the same manner as in known engines of the type described.

It is of no importance at what angle the fuel is injected into the duct *e*. It may be injected in the direction of the retort or toward the working cylinder or at right angles to the direction of motion of the air in the duct. For in every case the direction of motion of the fuel is determined by the existing direction of flow of the air, i. e., at first toward the retort and after the explosion has taken place therein toward the working cylinder. The energy of flow of the fuel itself is dissipated by forming eddies at the walls of the duct, which is only advantageous for the atomization.

In consequence of the good conduction of the pure air in the retort the gases are raised to a high temperature so that it is possible to utilize oils which ignite with difficulty, such as tar-oils, without an admixture of readily inflammable oils.

The pump may be driven directly by the valve shaft *j* or by the main shaft with the aid of a suitably shaped cam *k* or with the aid of levers, thrust rods or other means of transmission.

When oils which ignite with difficulty are employed it is well-known to employ drops of readily inflammable oils for igniting them. It is of great importance to bring the igniting drop, which is exceedingly small, at the beginning of the injection of the heavy oil into the neck of the retort, in order that the preliminary explosion may certainly take place. Therefore the described means must be employed both for the light igniting oil and for the heavy working oil, in order to bring both of them exactly at the intended time into the duct or neck of the retort. Fig. 2 shows such a form of apparatus comprising a pump *a* for the heavy oil and a pump *a'* for light igniting oil connected by pipes *d* and *d²*, respectively, controlled by check valves *c*, *c'*, respectively, to the duct *e*.

The operation of this apparatus will be readily understood from the foregoing description.

I claim:—

1. In an internal combustion engine of the character described, the combination of a cylinder, a piston movable therein, an auxiliary chamber, a duct connecting said chamber with the cylinder, a fuel pump, and a short water-cooled rigid pipe having a very small cubic content connecting the fuel pump with said duct, for the purpose specified.

2. In an internal combustion engine of the character described, the combination of a cylinder, a piston movable therein, an auxiliary chamber, a duct connecting said chamber with the end of the working cylinder, a water jacket surrounding said end of the cylinder, a fuel pump, and a rigid pipe of very small cubic contents passing through the water jacket and connecting the fuel pump with said duct, for the purpose specified.

3. In an internal combustion engine of the character described, the combination of a cylinder and a piston movable therein, a retort, a duct connecting the retort with the cylinder, a main fuel pump, an auxiliary fuel pump, and pipes connecting the pumps with said duct, each of said pipes being of very small cubic content, for the purpose specified.

4. In an internal combustion engine of the character described, the combination of a cylinder and a piston movable therein, a retort, a duct connecting the retort with the cylinder, a main fuel pump, an auxiliary fuel pump, and pipes connecting the pumps with said duct, each of said pipes being uniformly cooled and of very small cubic content, for the purpose specified.

5. In an internal combustion engine of the character described, the combination of a cylinder, and a piston movable therein, a retort, a duct connecting the retort with the cylinder, a main fuel pump, an auxiliary fuel pump, and pipes connecting the pumps with said duct, each of said pipes being very rigid and of very small cubic content, for the purpose specified.

6. In an internal combustion engine of the character described, the combination of a cylinder, and a piston movable therein, a retort, a duct connecting the retort with the cylinder, a main fuel pump, an auxiliary fuel pump, and pipes connecting the pumps with said duct, each of said pipes being very rigid, uniformly cooled and of very small cubic content, for the purpose specified.

7. In an internal combustion engine of the character described, the combination of a cylinder, a piston movable therein, an auxiliary chamber, a duct connecting the chamber with the cylinder, a fuel pump, and a short rigid pipe having a small cubic content surrounded by a water cooling medium to insure the cooling thereof connecting the fuel pump with the duct.

8. In an internal combustion engine of the character described, the combination of a cylinder, a piston movable therein, an auxiliary chamber, a duct connecting the chamber with the cylinder, a fuel pump, and a short rigid pipe having a small cubic content surrounded by a water cooling medium to insure the cooling thereof connecting the fuel pump with the duct.

9. In an internal combustion engine of the character described, the combination with a cylinder, a piston movable therein, an auxiliary chamber, a duct connecting said chamber with the cylinder, a water jacket surrounding the cylinder, a fuel pump and a rigid pipe of small cubic content connecting the pump with the duct passing through the water jacket and being surrounded by the water therein substantially throughout its lengths for the purpose specified.

In testimony whereof, I affix my signature in the presence of two witnesses.

KARL STEINBECKER.

Witnesses:
 WOLDEMAR HAUPT,
 HENRY HASPER.